Oct. 11, 1932.  J. W. MacCLATCHIE  1,882,434
PISTON
Filed March 31, 1930
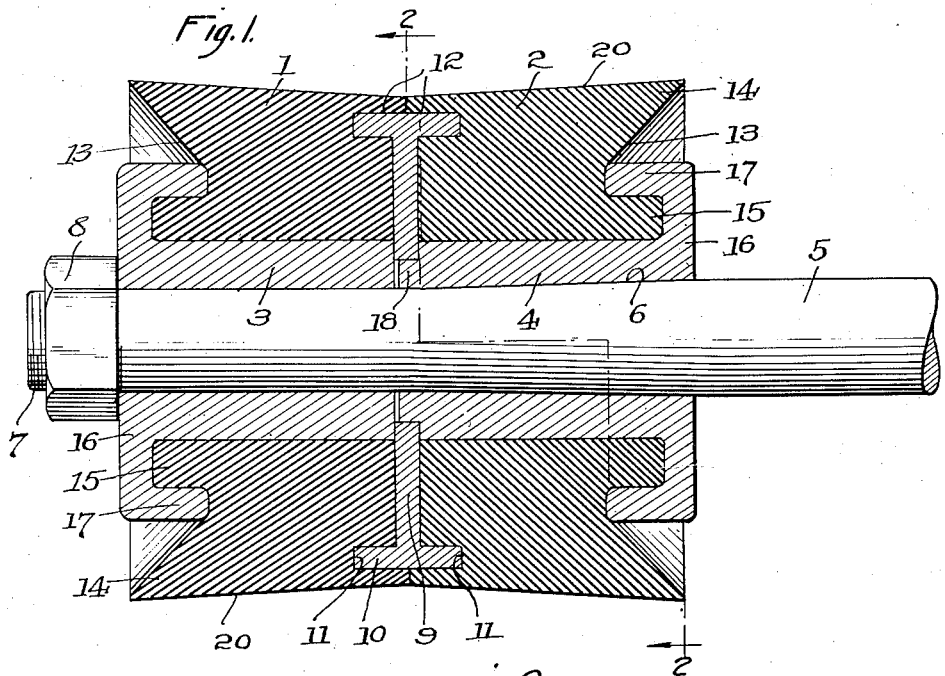
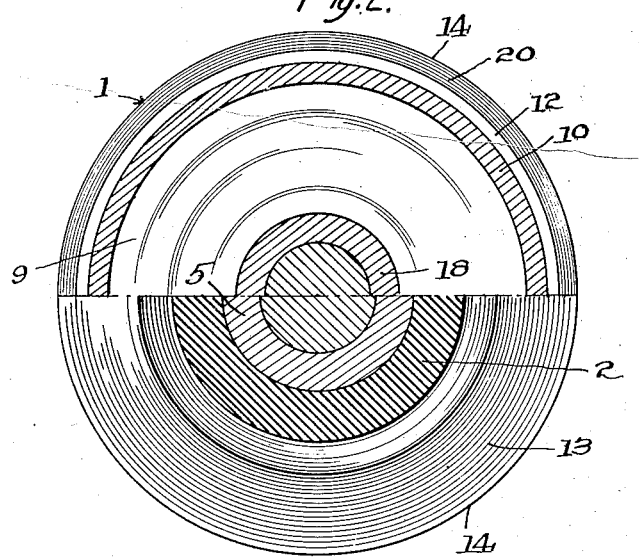
INVENTOR.
John W. MacClatchie,
BY
R. W. Smith
ATTORNEY.

Patented Oct. 11, 1932

1,882,434

UNITED STATES PATENT OFFICE

JOHN W. MacCLATCHIE, OF COMPTON, CALIFORNIA

PISTON

Application filed March 31, 1930. Serial No. 440,336.

This invention is a piston for pumps and the like; and has for its object to provide for ready replacement of the packing element of the piston when it becomes worn, while continuing to use the same main portion of the piston which is not subjected to wear, thereby providing for inexpensive and convenient renewal of the piston.

It is a further object of the invention to mount the renewable packing element on detachable supporting means which releasably secures the packing element in assembled relation and provides a firm and rigid support therefor, the said supporting means preferably also axially compressing the packing so as to insure its radial expansion for operative engagement with the wall of its cylinder.

It is a still further object of the invention to arrange the detachable supporting means and the packing element whereby fluid pressure in the cylinder is directed radially outwardly against the ends of the packing element for positively radially expanding the same to operative engagement with its cylinder wall, and the packing element is preferably also arranged whereby its ends are normally of greater diameter than that of the cylinder bore in which it is received, so that the ends of the packing element tend to operatively engage the cylinder wall irrespective of the pressure in the cylinder.

It is a still further object of the invention to provide reinforcement means for the packing element so as to prevent excessive distortion thereof, with said reinforcement means preferably seating on the detachable supporting means on which the packing element is mounted.

It is a still further object of the invention to adapt the packing element for detachable mounting on its reinforcement means, and to provide for ready assembly of the parts with the packing element positively fixed with relation to both its reinforcement means and its supporting means.

It is a still further object of the invention to position the reinforcement means so as to form a positive abutment medially of the axial length of the packing in order that the packing element may be axially compressed against said abutment, and to also arrange the reinforcement means so as to provide a radial backing for the packing.

It is a still further object of the invention to provide a construction wherein the packing element of the piston forms the sole contacting surface in engagement with the cylinder wall, thereby eliminating all metal to metal contact and thus avoiding excessive wear.

Further objects of the invention will be readily understood from the following description of the accompanying drawing, in which:

Fig. 1 is an axial section through a piston.

Fig. 2 is a transverse section on the line 2—2 of Fig. 1.

The piston comprises packing elements 1—2 detachably mounted on supporting elements 3—4 which are in turn detachably mounted on a piston rod 5, the piston rod having usual wedging means for limiting axial movement of the piston thereon, shown in the present instance as a taper 6 in axially spaced relation from the threaded end 7 of the rod which is adapted to receive a retaining nut 8.

The packing elements 1—2 are interchangeable and each comprise an annulus of yieldable packing material such as rubber, and are adapted for mounting on supporting elements 3—4 with a reinforcement element formed of a suitable metal positioned between the proximate axial ends of the cooperating packing elements and held in place by the supporting elements 3—4.

The reinforcement element comprises an annulus 9 projecting radially outwardly from supporting elements 3—4 and having its respective faces at right angles to the axis of the piston and adapted for abutment by the proximate axial ends of the cooperating packing elements 1—2, with the outer periphery of the annulus terminating short of the outer periphery of the packing elements and axially flanged as shown at 10 for reception of the respective ends of said axial flange in cooperating annular recesses 11 in the proximate ends of the cooperating packing elements; and the packing elements have axially extending outer peripheral lips 12 adapted to radially overlie flange 10 and axially abut when the piston is assembled as shown in Fig. 1.

The outer ends of the packing elements are preferably annularly recessed as shown at 13 so as to form axially projecting tapering lips 14 at the outer periphery of the packing elements, and at the inner periphery of the packing elements the recesses 13 terminate in axially extending annular flanges 15 which are adapted for engagement by the ends of supporting elements 3—4. For this purpose the supporting elements 3—4 are suitable metallic collars adapted for reception on the piston rod 5 as shown in Fig. 1; and at their axially outer ends these supporting collars are radially flanged as shown at 16 so as to overlie the ends of flanges 15 of the packing elements, and the radial flanges 16 terminate in inwardly extending axial flanges 17 which are adapted to radially overlie the flanges 15 of the packing elements.

At their proximate inner ends the collars 3—4 are adapted for abutment against the respective faces of annulus 9, and at its inner end, one of the supporting collars, shown in the present instance as collar 4, preferably has an axially extending cylindrical neck 18 of restricted diameter adapted for mounting of annulus 9 thereon, with the end of neck 18 spaced from the proximate end of collar 3 when the parts are assembled, and thereby rigidly clamping the annulus 9 against both radial and axial displacement.

When assembling the piston, the collar 4 is slipped onto piston rod 5 so as to wedge on taper 6, and the packing element 2 is then mounted on collar 4 with its flange 15 engaged by the flanges 16—17 of the collar. The annulus 9 is then mounted on neck 18 with one end of its axial flange 10 seating in the recess 11 of packing element 2, and the collar 3 with packing element 1 mounted thereon and having its flange 15 engaged by flanges 16—17 of the collar, is then slipped onto the piston rod so that the opposite end of axial flange 10 seats in the recess 11 of packing element 1, and the inner end of collar 3 abuts against annulus 9. Nut 8 is then threaded onto the end 7 of the piston rod and thereby clamps the supporting collars 3—4 against the annulus 9, and also axially compresses the packing elements 1—2 against said abutment annulus. By removing nut 8 the packing elements and their supporting collars may be readily displaced with new packing elements then mounted on the same supporting collars and clamped in operative position abutting against the same annulus 9, thereby renewing the piston by only replacing those elements, namely the packing annuli, which are subject to wear.

With the parts assembled, the collars 3—4 seat firmly on piston rod 5, and the packing elements are in turn firmly seated on their supporting collars, with the outer ends of the packing elements positively engaged by flanges 16—17, and the proximate inner ends of the packing elements longitudinally abutting against the right angular faces of reinforcement 9 and positively engaged by the flange 10 seating in recesses 11, and the lips 12 of the packing elements overlying the flange 10 and axially abutting so that the packing 1—2 forms the sole contacting surface with the wall of the cylinder bore. The flaring lips 14 at the ends of the piston provide means whereby pressure in the cylinder directed against said lips radially expand the lips for engagement with the cylinder wall, and the cylinder pressure also axially compresses the packing elements against annulus 9, so that the packing elements are operatively radially expanded without undue radial distortion at any one point along their length, with the flange 10 forming a radial backing for the packing elements.

By independently clamping the respective elements between the reinforcement 9 and the flange 16 of its cooperating supporting collar, and longitudinally compressing the packing elements against the respective right angular faces of the reinforcement, excessive bulging and wearing of the packing medially of its length is prevented, while at the same time assuring operative contact of the packing against the cylinder wall throughout the axial length of the packing as a result of the radial backing 10 which is provided for the packing medially of its length.

In order to assure operative engagement by the packing irrespective of the cylinder pressure, the outer peripheries of packing elements 1—2 may taper slightly as shown at 20, so that the ends of the packing are of increased diameter, normally somewhat greater than that of the cylinder bore, whereby the ends of the packing are radially compressed when the piston is inserted in its cylinder, thereby tensioning the packing for operative engagement with the cylinder wall.

I claim:

1. In a piston, a piston rod, supporting collars adapted for mounting on the piston rod, annular packing elements on the respective supporting collars, a neck of restricted diameter at the inner end of at least one of the collars, and an annular reinforcement adapted for mounting on said neck between the adjacent ends of the packing elements and terminating at its outer periphery in a flange extending longitudinally of the piston, the packing elements having peripheral longitudinal lips overlying said flange, the supporting collars having flanged outer ends adapted for clamping engagement with the outer ends of the packing elements, said outer ends of the packing elements forming longitudinally projecting undercut tapering lips at the outer peripheries of the packing elements, and said outer peripheries of the packing elements tapering to normally increased diameter toward their lipped outer ends.

2. In a piston, a piston rod, supporting collars adapted for mounting on the piston rod, annular packing elements on the respective supporting collars, a neck of restricted diameter at the inner end of at least one of the collars, and an annular reinforcement adapted for mounting on said neck between the adjacent ends of the packing elements and terminating at its outer periphery in a flange extending longitudinally of the piston, the packing elements having peripheral longitudinal lips overlying said flange, the supporting collars having flanged outer ends adapted for clamping engagement with the outer ends of the packing elements, and said outer ends of the packing elements forming longitudinally projecting undercut tapering lips at the outer peripheries of the packing elements.

3. In a piston, a piston rod, supporting collars adapted for mounting on the piston rod, annular packing elements on the respective supporting collars, a neck of restricted diameter at the inner end of at least one of the collars, and an annular reinforcement adapted for mounting on said neck between the adjacent ends of the packing elements and terminating at its outer periphery in a flange extending longitudinally of the piston, the packing elements having peripheral longitudinal lips overlying said flange, the supporting collars having flanged outer ends adapted for clamping engagement with the outer ends of the packing elements, and the outer peripheries of the packing elements tapering to normally increased diameter toward their outer ends.

4. In a piston, a piston rod, supporting collars adapted for mounting on the piston rod, annular packing elements on the respective supporting collars, and an annular reinforcement clamped by the supporting collars between the adjacent ends of the packing elements and terminating at its outer periphery in a flange extending longitudinally of the piston, the packing elements having peripheral longitudinal lips overlying said flange, the supporting collars having flanged outer ends adapted for clamping engagement with the outer ends of the packing elements, said outer ends of the packing elements forming longitudinally projecting undercut tapering lips at the outer peripheries of the packing elements, and said outer peripheries of the packing elements tapering to normally increased diameter toward their lipped outer ends.

5. In a piston, a piston rod, supporting collars adapted for mounting on the piston rod, annular packing elements on the respective collars, and an annular reinforcement clamped by the supporting collars between the adjacent ends of the packing elements and terminating at its outer periphery in a flange extending longitudinally of the piston, the packing elements having peripheral longitudinal lips overlying said flange, the supporting collars having flanged outer ends adapted for clamping engagement with the outer ends of the packing elements, and said outer ends of the packing elements forming longitudinally projecting undercut tapering lips at the outer peripheries of the packing elements.

6. In a piston, a piston rod, supporting collars adapted for mounting on the piston rod, annular packing elements on the respective supporting collars, and an annular reinforcement clamped by the supporting collars between the adjacent ends of the packing elements and terminating at its outer periphery in a flange extending longitudinally of the piston, the packing elements having peripheral longitudinal lips overlying said flange, the supporting collars having flanged outer ends adapted for clamping engagement with the outer ends of the packing elements, and the outer peripheries of the packing elements tapering to normally increased diameter toward their outer ends.

In testimony whereof I have affixed my signature.

JOHN W. MacCLATCHIE.